United States Patent
Murata (10) Patent No.: US 7,520,516 B2
(45) Date of Patent: Apr. 21, 2009

(54) SUSPENSION TRAILING ARM

(75) Inventor: Satoshi Murata, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/091,756

(22) PCT Filed: Nov. 3, 2006

(86) PCT No.: PCT/IB2006/003096

§ 371 (c)(1),
(2), (4) Date: Apr. 28, 2008

(87) PCT Pub. No.: WO2007/052139

PCT Pub. Date: May 10, 2007

(65) Prior Publication Data

US 2008/0277893 A1    Nov. 13, 2008

(30) Foreign Application Priority Data

Nov. 4, 2005    (JP) ............................. 2005-321206

(51) Int. Cl.
*B60G 3/12* (2006.01)
(52) U.S. Cl. .......................... 280/124.128; 280/124.116
(58) Field of Classification Search .......... 280/124.128, 280/124.129, 124.131, 124.132, 124.133, 280/124.153, 124.116, 124.13, 124.125
See application file for complete search history.

(56) References Cited

U.S. PATENT DOCUMENTS

| 6,059,314 | A | * | 5/2000 | Streubel et al. ............. 280/798 |
| 6,086,162 | A | * | 7/2000 | Pinch et al. ............... 301/124.1 |
| 6,152,468 | A | | 11/2000 | Glaser et al. |
| 6,702,308 | B2 | * | 3/2004 | Yamaguchi .......... 280/124.166 |
| 7,044,565 | B2 | * | 5/2006 | Kang ......................... 301/127 |
| 7,204,498 | B2 | * | 4/2007 | Alesso et al. ......... 280/124.106 |

FOREIGN PATENT DOCUMENTS

| FR | 2 861 647 | 5/2005 |
| JP | 5-69713 | 3/1993 |
| JP | 08197926 | 8/1996 |
| JP | 08216639 | 8/1996 |
| JP | 2004 322913 | 11/2004 |
| JP | 2005-81905 | 3/2005 |
| WO | WO 2005/042274 A1 | 5/2005 |

\* cited by examiner

*Primary Examiner*—Ruth Ilan
(74) *Attorney, Agent, or Firm*—Oblon, Spivak, McClelland, Maier & Neustadt, P.C.

(57) ABSTRACT

In a trailing arm suspension for a vehicle, an axle carrier is fitted to the wheel-side end of a trailing arm, and an axle bearing is fitted to the axle carrier. The axle carrier includes a first flat plate-like member and a second flat plate-like member. The first flat plate-like member is arranged in substantially the longitudinal direction of the vehicle. The axle bearing is fitted to the first flat plate-like member. The second flat plate-like member is fixed to the front end of the first flat plate-like member at an angle at or around 90 degrees. The second flat plate-like member is fixed to the wheel-side end of the trailing arm at an angle within the range of 60 degrees to 90 degrees.

14 Claims, 8 Drawing Sheets

SUSPENSION TRAILING ARM

BACKGROUND OF THE INVENTION

1. Field of the Invention

The invention relates generally to the structure of a trailing arm suspension that is used in a vehicle. More specifically, the invention relates to the structure of a lightweight and high-performance trailing arm suspension and a lightweight and high-performance axle carrier.

2. Description of the Related Art

Japanese Patent Application Publication No. JP-A-08-197926 describes the structure of a trailing arm suspension in which a curved trailing arm is directly welded to an axle carrier.

Japanese Patent Application Publication No. JP-A-2004-322913 describes the structure of a trailing arm suspension in which a longer trailing arm is provided so as to be passed through and fixed to an axle carrier.

Figure 1:
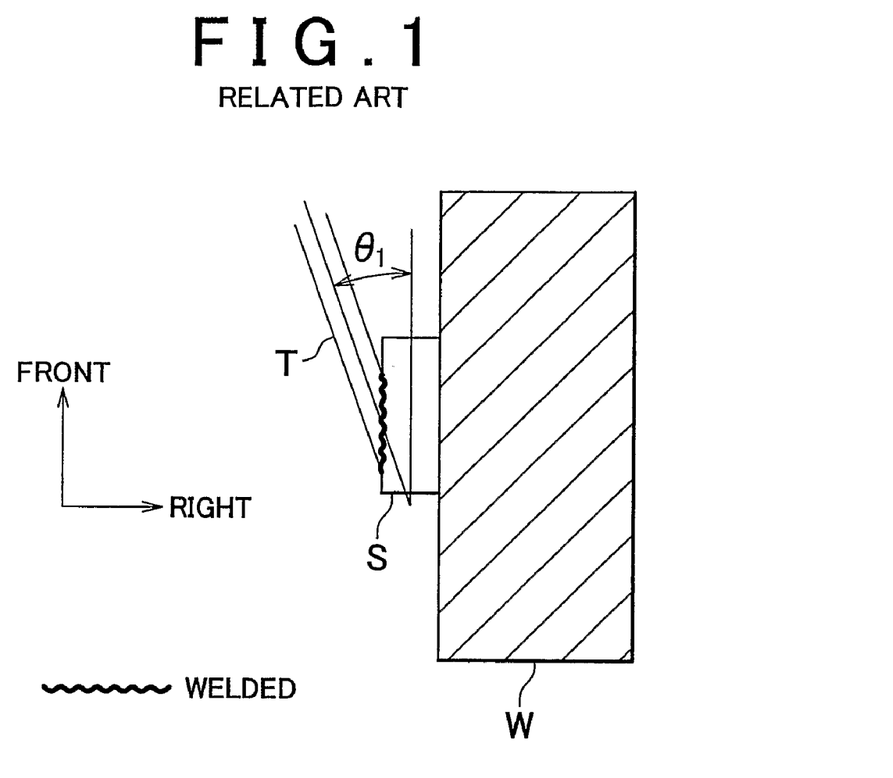
FIG. 1 is the top view of a right rear wheel, schematically showing the manner in which a trailing arm is fitted to an axle carrier in, a trailing arm suspension structure according to a related art.

FIG. 1 schematically illustrates the positional relationship between a trailing arm T and an axle carrier S, in the lateral direction of a vehicle, in a trailing arm suspension. FIG. 1 shows a right rear wheel viewed from the top of the vehicle.

The wheel-side end of the trailing arm T is directly welded to the axle carrier S in order to provide a lightweight trailing arm suspension having high stiffness. In such structure, the axle carrier S is a plate-like member that extends in substantially the longitudinal direction of the vehicle, as shown in FIG. 1. An axle bearing (not shown), which rotatably supports a wheel W, is fitted to the outboard side of the axle carrier S. Also, the wheel-side end of the trailing arm T is directly welded to the inboard side of the axle carrier S.

In order to function well, the trailing arm T needs to extend in substantially the longitudinal direction of the vehicle. Also, the trailing arm T needs to be fitted a vehicle body so as to be pivotable, in substantially the vertical direction of the vehicle, about an axis that extends in substantially the lateral direction of the vehicle. Consequently, an angle $\theta_1$, which the trailing arm T forms with the axle carrier S when the wheel-side end of the trailing arm T is butt-welded to the axle carrier S, is small, as shown in FIG. 1.

However, decreases in the angle, at which the trailing arm T butts against the axle carrier S, reduce ease in the welding operation. Accordingly, with the structure, in which the wheel-side end of the trailing arm T is directly welded to the axle carrier S, the butt-welding operation is difficult to perform.

Figure 2:
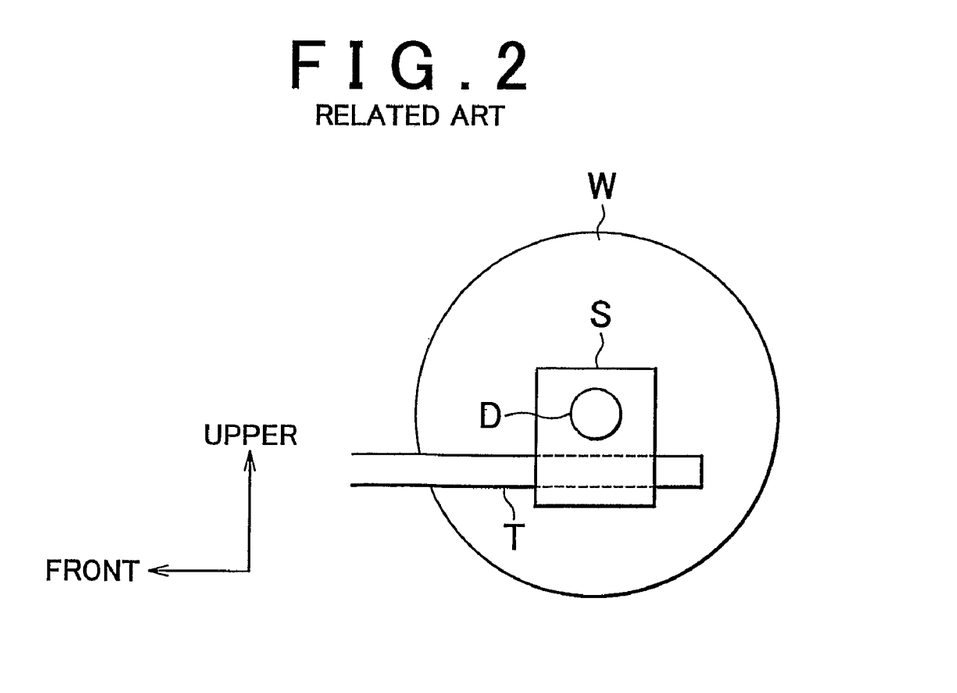
FIG. 2 is the side view of a right rear wheel viewed from a position inboard of an axle carrier, schematically showing the manner in which a trailing arm is fitted to the axle carrier in a trailing arm suspension structure according to another related art.

FIG. 2 schematically illustrates the positional relationship between a trailing arm T and an axle carrier S, in the vertical direction of a vehicle, in a trailing arm suspension. FIG. 2 illustrates the side view of a right rear wheel viewed from a position inboard of the axle carrier S. FIG. 2 shows the structure for a four-wheel drive vehicle in which the axle carrier S has a drive shaft fitting structure D.

As shown in FIG. 2, when the structure, in which the wheel-side end of the trailing arm T is directly welded to the axle carrier S, is employed in a four-wheel drive vehicle, the trailing arm T passes through and is directly welded to the axle carrier S, at a position below a hole through which the drive shaft is fitted. Accordingly, the length of the trailing arm T needs to be longer in the backward direction of the vehicle, in comparison to when this structure is employed in a front-wheel drive vehicle. Also, in the trailing arm suspension structure used for the four-wheel drive vehicle above, the length of the axle carrier S needs to be longer in the downward direction of the vehicle. In other words, the axle carrier S for the front-wheel drive vehicle and the axle carrier S for the four-wheel drive vehicle cannot share the same design. Also, the axle carrier S for the four-wheel drive vehicle is heavier than the axle carrier S for the front-wheel drive vehicle.

Although not shown in FIG. 1, a harness of an ABS sensor, which extends from the axle bearing (not shown) fitted to the outboard side of the axle carrier S, is routed to the inside of the vehicle through through-holes formed in the axle carrier S and the trailing arm T in the trailing arm suspension. However, routing the harness in such a manner makes it difficult to attach/detach a connector.

SUMMARY OF THE INVENTION

The invention provides a structure of a lightweight and high-performance trailing arm suspension and a lightweight and high-performance axle carrier.

A first aspect of the invention relates to an axle carrier of a trailing arm suspension for a vehicle, which is fitted to the wheel-side end of a trailing arm, and to which an axle bearing is fitted. The axle carrier includes a first flat plate-like member and a second flat plate-like member. The first flat plate-like member is arranged in a substantially longitudinal direction of the vehicle. The axle bearing is fitted to the first flat plate-like member. The second flat plate-like member is connected to the front end of the first flat plate-like member at an angle that falls within a first predetermined angle range. The second flat plate-like member is connected to the wheel-side end of the trailing arm at an angle that falls within a second predetermined angle range.

In the first aspect of the invention, the first flat plate-like member and the second flat plate-like member may be integrally formed with each other, for example, by press working.

In the first aspect of the invention, the first predetermined angle range may be from 60 degrees to 90 degrees. Thus, the axle carrier according to the first aspect of the invention can be used in both front-wheel drive vehicles and four-wheel drive vehicles. Also, the space for arranging a drive shaft is ensured.

In the first aspect of the invention, the second predetermined angle range may be from 60 degrees to 90 degrees. Thus, the butt-welding operation can be performed easily.

According to the first aspect of the invention, a sufficiently large angle, which the trailing arm forms with the face of the axle carrier to which the trailing arm is fitted, is ensured. Accordingly, the welding operation is easier to perform.

According to the first aspect of the invention, the trailing arm is not present in the space inboard of the first flat plate-like member in the lateral direction of the vehicle. Accordingly, this space can be used to arrange the drive shaft or to route a harness of an ABS sensor. Thus, the axle carrier can be used in both four-wheel drive vehicles and front-wheel drive vehicles. It is also easier to attach/detach a connector.

According to the first aspect of the invention, the position, at which the trailing arm is welded to the axle carrier, is closer to the front of the vehicle than that of the related art. Accordingly, it is possible to use a trailing arm that is shorter than that of the related art, which reduces the weight and improves the stiffness of the trailing arm suspension.

The axle carrier according to the first aspect of the invention may further include a reinforcing member that is fixed to the first flat plate-like member and the trailing arm. In this case, the reinforcing member may be integrally formed with the first flat plate-like member, and/or the reinforcing member may be fixed to the second flat plate-like member.

A second aspect of the invention relates to a trailing arm suspension structure for a vehicle, which includes right and left trailing arms that are fitted to a vehicle body frame via respective elastic members; and axle carriers which are fitted to the wheel-side ends of the respective trailing arms, and to which respective axle bearings are fitted. Each axle carrier includes a first flat plate-like member and a second flat plate-like member. The first flat plate-like member is arranged in a substantially longitudinal direction of the vehicle. The axle bearing is fitted to the first flat plate-like member. The wheel-side end of the trailing arm is fitted to the second flat plate-like member. The second flat plate-like member is connected to the front end of the first flat plate-like member at an angle that falls within a first predetermined angle range. The wheel-side end of the trailing arm is connected to the second flat plate-like member at an angle that falls within a second predetermined angle range.

In the second aspect of the invention, the first flat plate-like member and the second flat plate-like member may be integrally formed with each other.

In the second aspect of the invention, the first predetermined angle range may be from 60 degrees to 90 degrees. Thus, the trailing arm suspension structure according to the second aspect can be used in both front-wheel drive vehicles and four-wheel drive vehicles. Also, the space for arranging a drive shaft is ensured.

In the second aspect of the invention, the second predetermined angle range may be from 60 degrees to 90 degrees. Thus, the butt-welding operation can be easily performed.

According to the second aspect of the invention, a sufficiently large angle, which the trailing arm forms with the face of the axle carrier to which the trailing arm is fitted, is ensured. Accordingly, the welding operation is easier to perform.

According to the second aspect of the invention, the trailing arm is not present in the space inboard of the first flat plate-like member in the lateral direction of the vehicle. Accordingly, this space can be used to arrange the drive shaft or to route a harness of an ABS sensor. Thus, the axle carrier can be used in both four-wheel drive vehicles and front-wheel drive vehicles. Also, it becomes easier to attach/detach a connector.

According to the second aspect of the invention, the position, at which the trailing arm is welded to the axle carrier, is closer to the front of the vehicle than that of the related art. Accordingly, it is possible to use a trailing arm that is shorter than that of the related art, which reduces the weight and improves the stiffness of the trailing arm suspension.

The trailing arm suspension structure according to the second aspect of the invention may further include a reinforcing member that is fixed to the first flat plate-like member and the trailing arm. In this case, the reinforcing member may be integrally formed with the first flat plate-like member, and/or the reinforcing member may be fixed to the second flat plate-like member.

The invention thus provides the structure of a lightweight and high-performance trailing arm suspension and a lightweight and high-performance axle carrier.

BRIEF DESCRIPTION OF THE DRAWINGS

The foregoing and further objects, features and advantages of the invention will become apparent from the following description of example embodiments with reference to the accompanying drawings, wherein the same or corresponding portions will be denoted by the same reference numerals and wherein.

DETAILED DESCRIPTION OF THE EXAMPLE EMBODIMENTS

Hereafter, an example embodiment of the invention will be described with reference to accompanying drawings. Because well known to persons skilled in the art pertinent to the invention, the basic concept, the main hardware configurations, and the operation principal of trailing arm suspensions will not be described below in detail.

Hereafter, a trailing arm suspension structure and an axle carrier used in the trailing arm structure according to the embodiment of the invention will be described with reference to FIGS. 3 to 10. The same or corresponding components will be denoted by the same reference numerals in FIGS. 3 to 10.

Figure 3:
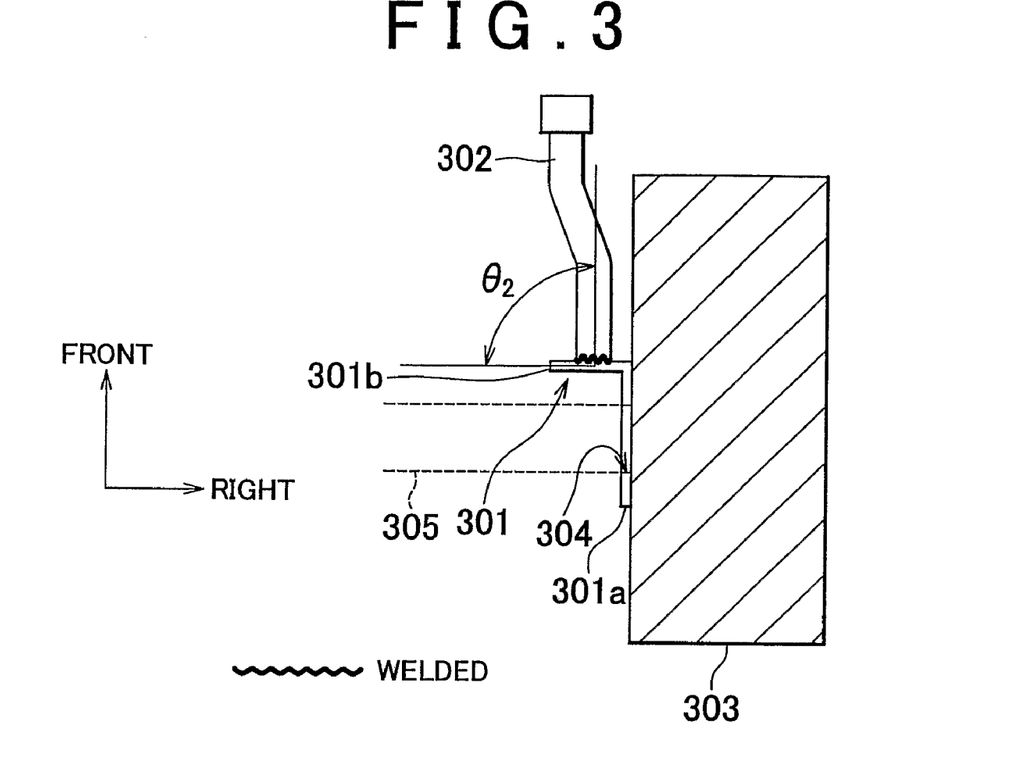
FIG. 3 is the view schematically showing an axle carrier for a trailing arm suspension according to an embodiment of the invention, when viewed from the top of a vehicle.
Figure 4:
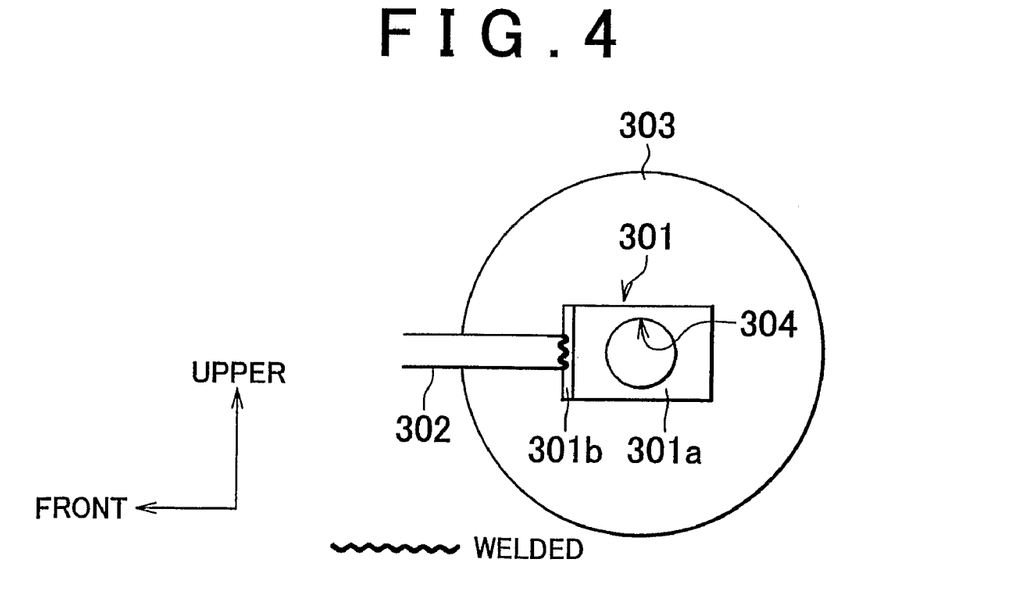
FIG. 4 is the side view showing the axle carrier for the trailing arm suspension according to the embodiment of the invention, when viewed from a position inboard of the axle carrier.

FIGS. 3 and 4 schematically illustrate the trailing arm suspension structure according to the embodiment. FIG. 3 illustrates the top view of a right rear wheel. FIG. 4 illustrates the side view of the right rear wheel, when viewed from a position inboard of the axle carrier. For convenience of explanation, only an axle carrier 301, a trailing arm 302, and a wheel 303 are shown in FIGS. 3 and 4. Other components such as an axle bearing, which is fitted to the axle carrier 301 and which rotatably supports the wheel 303, are not shown in FIGS. 3 and 4.

As shown in FIG. 3, the axle carrier 301 according to the embodiment is a substantially L-shaped member. The axle carrier 301 is formed mainly of a first flat plate-like portion 301a, which is arranged in substantially the longitudinal direction of the vehicle; and a second flat plate-like portion 301b, which is arranged in substantially the lateral direction of the vehicle.

When viewed from the top of the vehicle, namely, on the plane substantially parallel to the ground surface, the first flat plate-like portion 301a and the second flat plate-like portion 301b are connected to each other at or around 90 degree angle, thereby forming a substantially L-shape. The vertically-extending front end of the first flat plate-like portion 301a and the vertically-extending outboard end of the second flat plate-like portion 301b are integrally fixed to each other in the vertical direction of the vehicle. If the angle, which the first flat plate-like portion 301a forms with the second flat plate-like portion 301b (i.e., the central angle of the L-shape), is within the range from 60 degrees to 90 degrees, when viewed from the top of the vehicle, the welding operation can be performed easily. As this angle approaches 90 degrees, it becomes easier to perform the welding operation. However, the angle is not limited to a certain value, as long as the axle carrier 301 according to the embodiment can be used in both four-wheel drive vehicles and front-wheel drive vehicles.

In the embodiment, the first flat plate-like portion 301a and the second flat plate-like portion 301b are integrally formed with each other, as a single rigid member (i.e., the axle carrier 301), as shown in FIG. 3. Alternatively, the first flat plate-like portion 301a and the second flat plate-like portion 301b may be prepared as separate two rigid members, and the axle carrier 301 may be formed by connecting these two portions 301a, 301b, for example, by welding.

The axle bearing (not shown) is fitted to the outboard side of the first flat plate-like portion 301a. Then, the wheel 303 is fitted to the outboard side of the axle bearing.

The wheel-side end of the trailing arm 302 is butt-welded to the front side of the second flat plate-like portion 301b.

With the structure and configuration according to the embodiment described above, a sufficiently large angle $\theta_2$, which the trailing arm 302 forms with the face of the axle carrier 301 (the front side of the second flat plate-like portion 301b) to which the trailing arm 302 is fitted, is ensured. Accordingly, the welding operation is easier to perform. If the angle $\theta_2$ is within the range from 60 degrees to 90 degrees, the welding operation can be easily performed. In particular, the closer the angle $\theta_2$ is to 90 degrees, the easier the welding operation becomes.

According to the embodiment, the trailing arm 302 is not present in the space inboard of the first flat plate-like portion 301a in the lateral direction of the vehicle. Accordingly, a drive shaft fitting structure 304 may be formed in the first flat plate-like portion 301a, and a drive shaft 305 (indicated by the dashed lines in FIG. 3) may be provided in this space. Alternatively, this space may be used to route a harness of an ABS sensor (not shown). When the drive shaft fitting structure 304 is formed in the flat plate-like portion 301a and the drive shaft 305 is provided in the space, the trailing arm suspension structure and the axle carrier according to the embodiment can be used in both four-wheel drive vehicles and front-wheel drive vehicles. Also, routing the harness of the ABS sensor through the space makes it easier to attach/detach a connector.

According to the embodiment, the position, at which the trailing arm 302 is welded to the axle carrier 301, is closer to the front of the vehicle than that of the related art, as shown in FIGS. 3 and 4. Accordingly, the trailing arm 302 may be shorter than that of the related art, which reduces the weight and improves stiffness of the trailing arm suspension.

In the embodiment, at least one rigid body serving as a reinforcing member (not shown in FIGS. 3 and 4, because this is not an essential component), which is separate from the axle carrier 301, may be fixed to both the axle carrier 301 and the trailing arm 302. Thus, connection between the axle carrier 301 and the trailing arm 302 is reinforced. Alternatively, such a reinforcing member may be integrally formed with one of the axle carrier 301 and the trailing arm 302.

Figure 5:
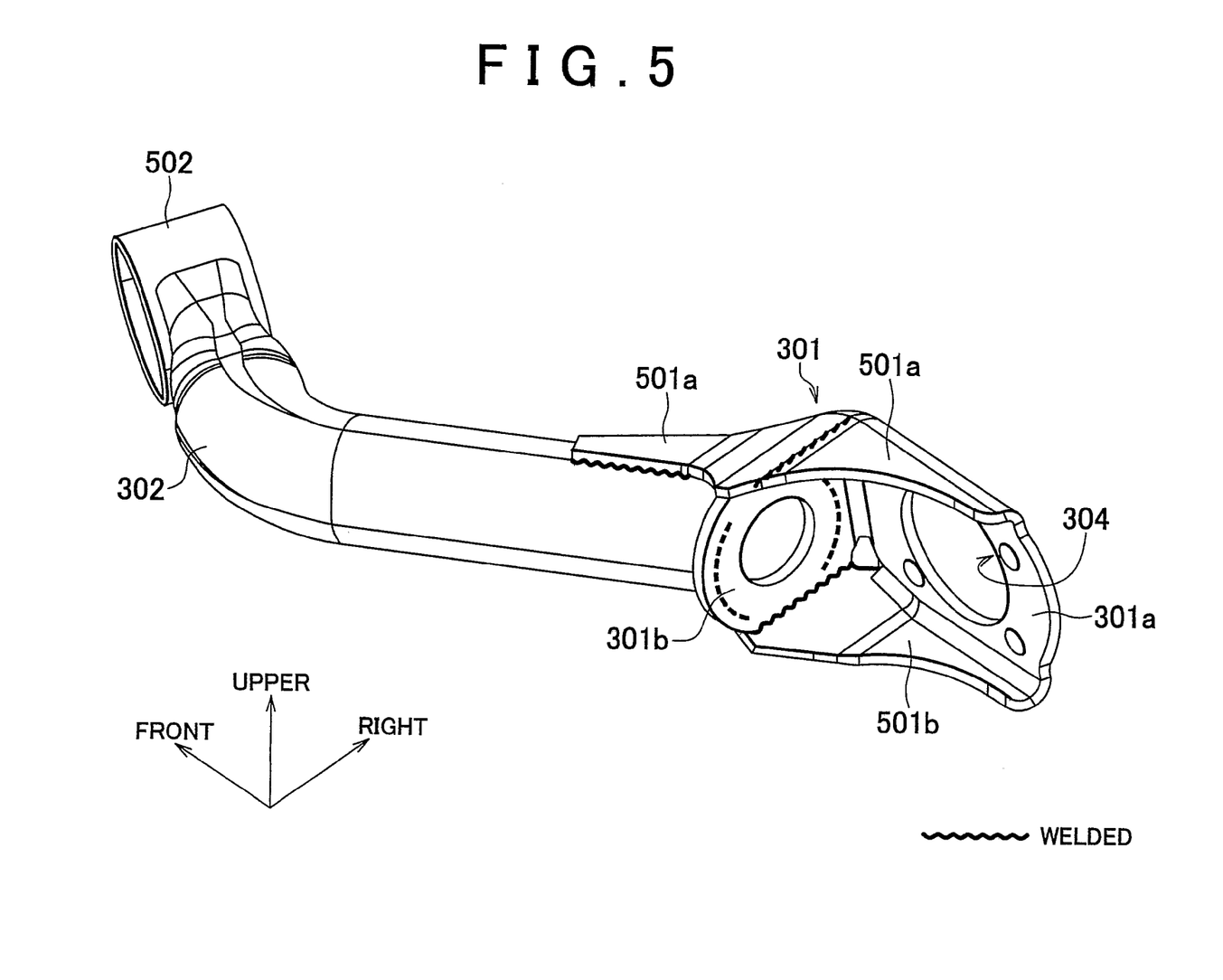
FIG. 5 is the perspective view showing the axle carrier for the trailing arm suspension according to a first modified example of the embodiment of the invention, when viewed from a position inboard of and above the axle carrier, and diagonally to the rear of the axle carrier.
Figure 6:
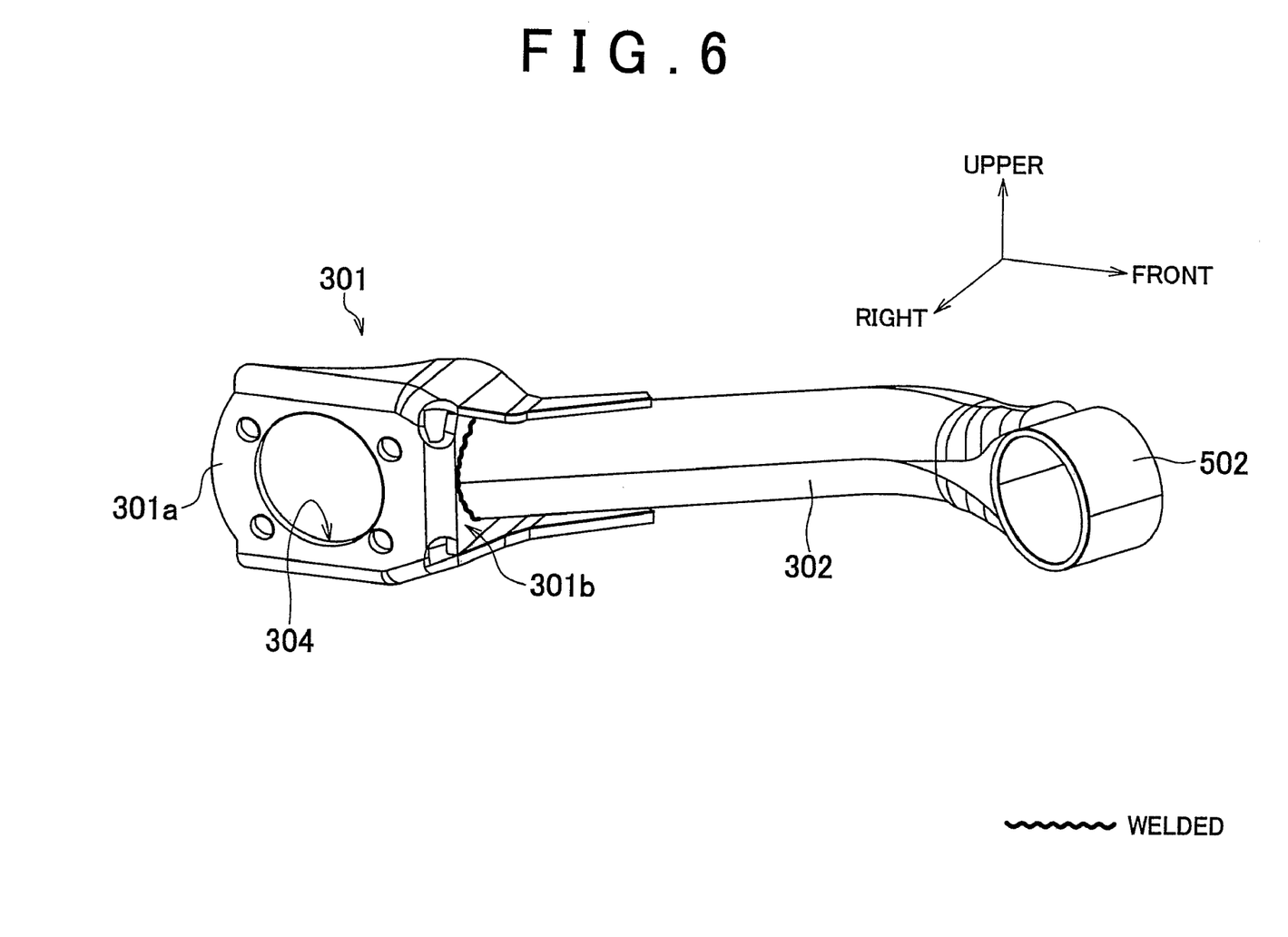
FIG. 6 is the perspective view showing the axle carrier for the trailing arm suspension according to the first modified example of the embodiment of the invention, when viewed from a position outboard of and above the axle carrier, and diagonally to the front of the axle carrier.
Figure 7:
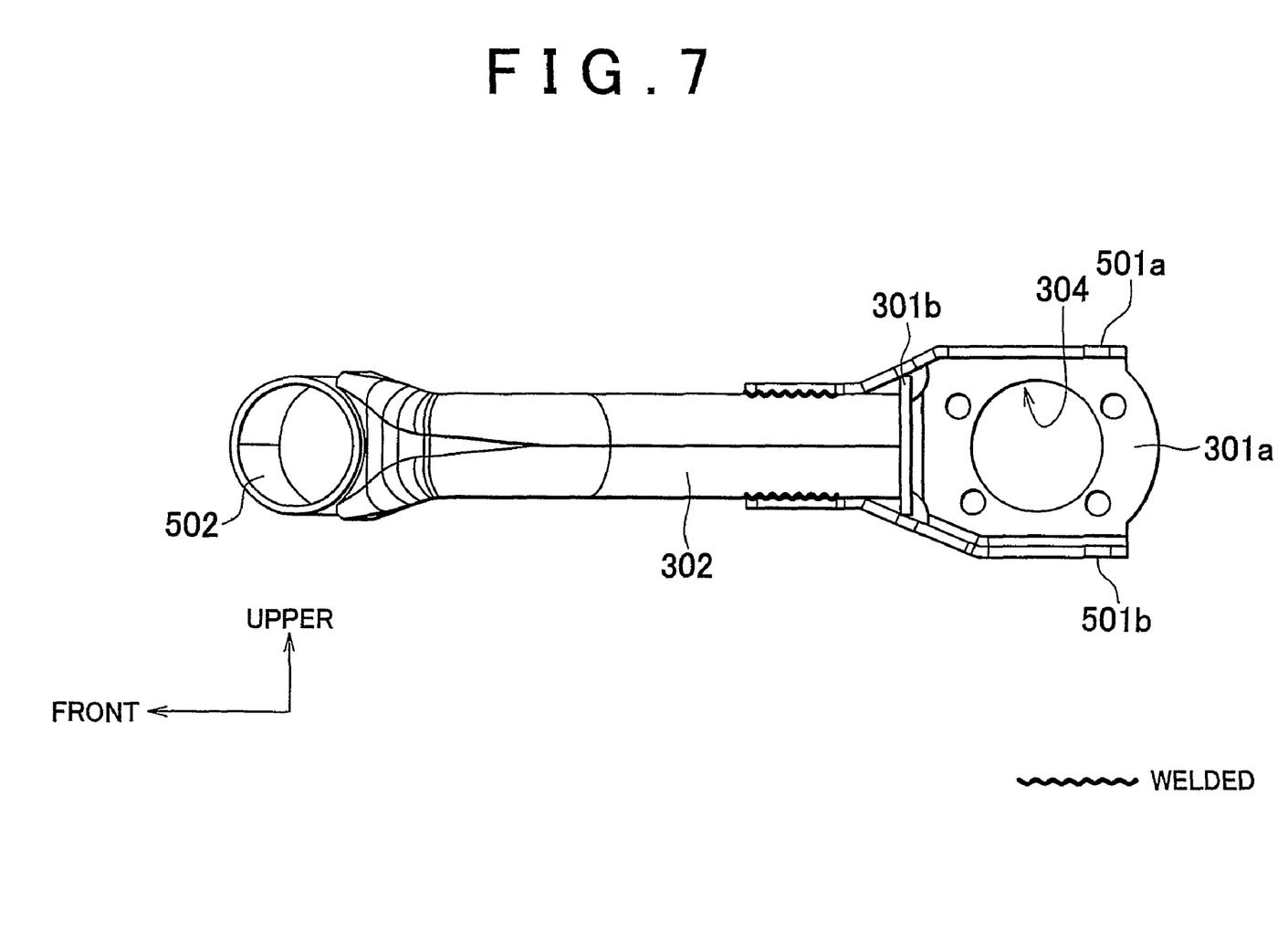
FIG. 7 is the side view showing the axle carrier for the trailing arm suspension according to the first modified example of the embodiment of the invention, when viewed from a position inboard of the axle carrier.
Figure 8:
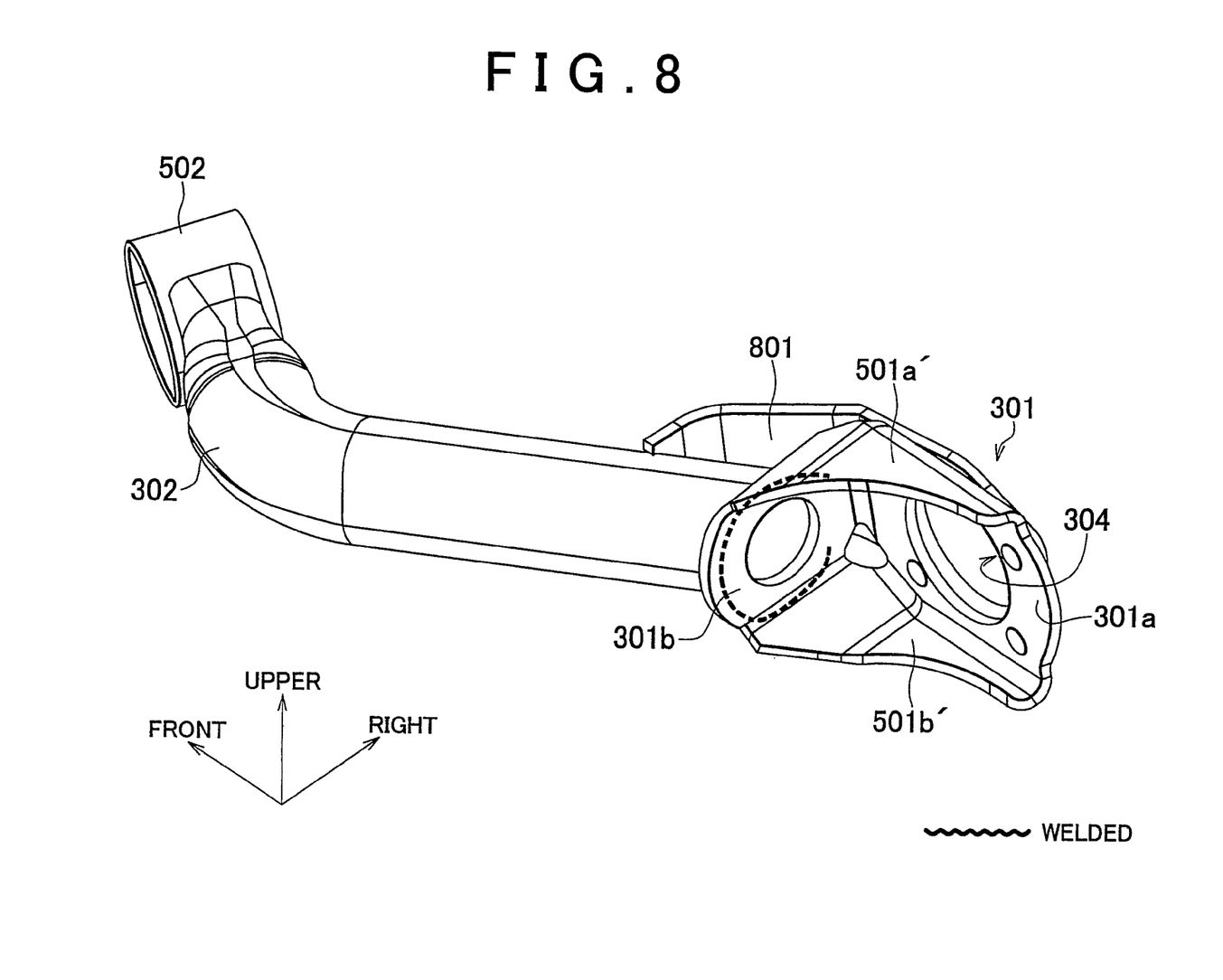
FIG. 8 is the perspective view showing the axle carrier for the trailing arm suspension according to a second modified example of the embodiment of the invention, when viewed from a position inboard of and above the axle carrier, and diagonally to the rear of the axle carrier.
Figure 9:
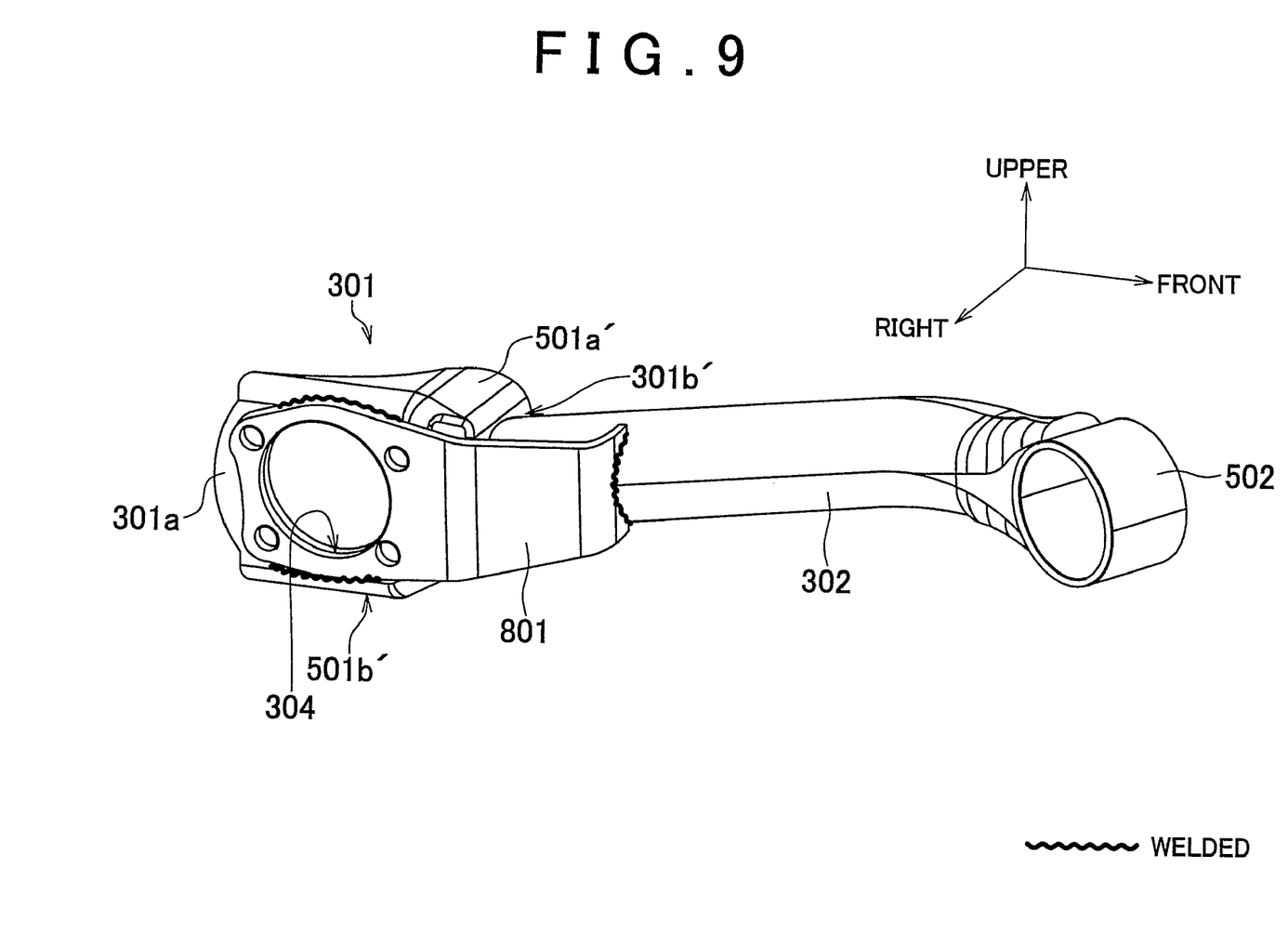
FIG. 9 is the side view showing the axle carrier for the trailing arm suspension according to the second modified example of the embodiment of the invention, when viewed from a position outboard of and above the axle carrier, and diagonally to the front of the axle carrier.
Figure 10:
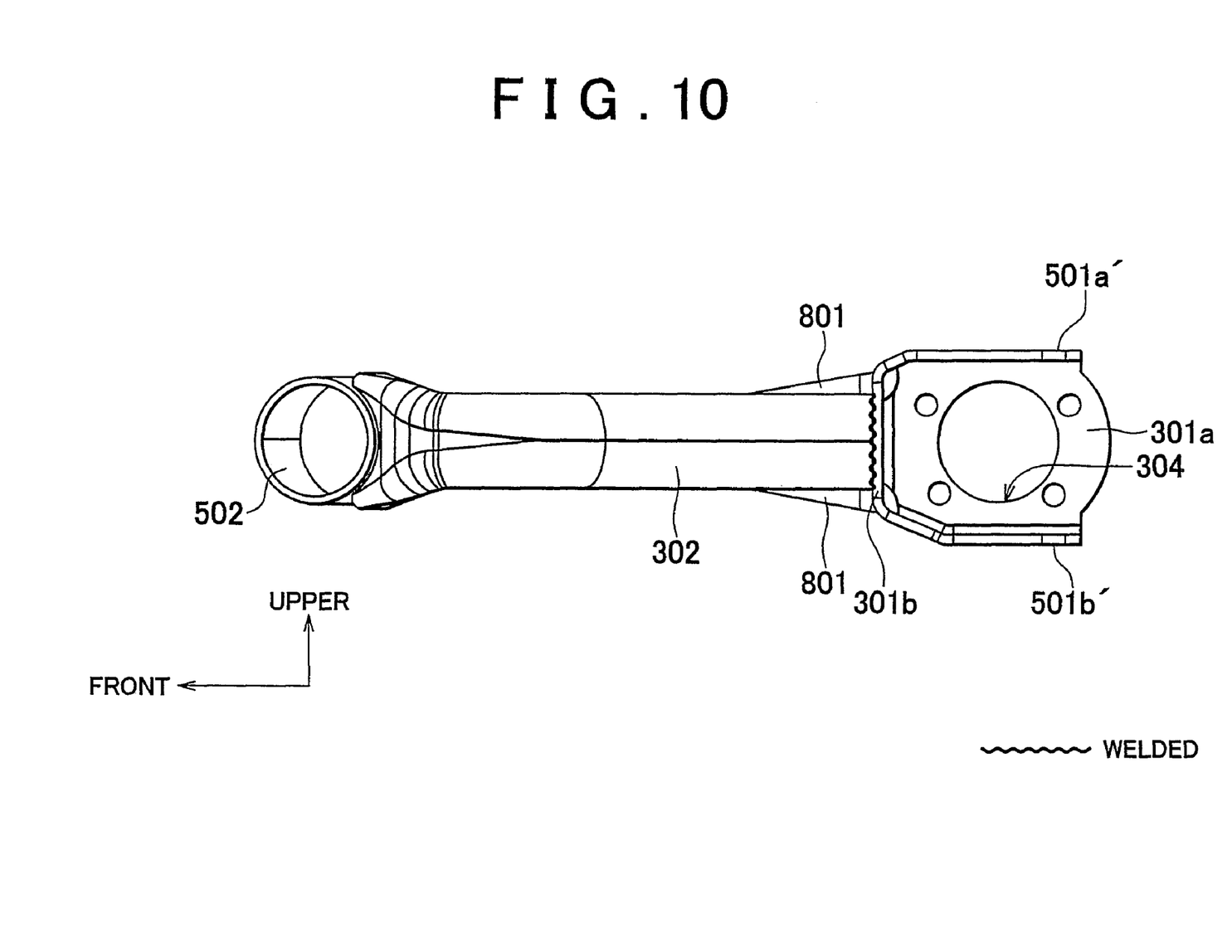
FIG. 10 is the perspective view showing the axle carrier for the trailing arm suspension according to the second modified example of the embodiment of the invention, when viewed from a position inboard of the axle carrier.

Next, the axle carrier for the trailing arm suspension according to modified examples of the embodiment will be described in detail. FIGS. 5 to 7 show the first modified example, and FIGS. 8 to 10 show the second modified example. Each modified example shows the structure for the right rear wheel. Each of FIGS. 5 and 8 is the perspective view of the axle carrier 301 when viewed from a position inboard of and above the axle carrier 301, and diagonally to the rear of the axle carrier 301. Each of FIGS. 6 to 9 is the perspective view of the axle carrier 301 when viewed from a position outboard of and above the axle carrier 301, and diagonally to the front of the axle carrier 301. Each of FIGS. 7 and 10 is the side view of the axle carrier 301, when viewed from a position inboard of the axle carrier 301. The components in FIGS. 5 to 10, which correspond to the components according to the embodiment schematically shown in FIGS. 3 and 4, are denoted by the same reference numerals as in FIGS. 3 and 4.

As shown in FIGS. 5 to 7, in the first modified example, the axle carrier 301 is formed of the first flat plate-like portion 301a, to which the axle bearing is fitted; the second flat plate-like portion 301b, to which the trailing arm 302 is fitted; and reinforcing portions 501a and 501b.

The axle carrier 301 is welded to the wheel-side end of the trailing arm 302, as shown in FIG. 5. A bushing collar 502, which houses a bushing provided between the trailing arm 302 and a vehicle body, is formed at the vehicle-body-side end of the trailing arm 302.

In the first modified example, the first flat plate-like portion 301a, the second flat plate-like portion 301b, and the reinforcing portions 501a and 501b are formed from a single metal member, and formed, for example, by press working. However, some or all of these portions may be prepared as separate rigid members, and welded together.

The reinforcing portion 501 includes the upper reinforcing portion 501a and the lower reinforcing portion 501b. The upper reinforcing portion 501a extends from the top end of the first flat plate-like portion 301a, and is welded to the top portion of the trailing arm 302 and the top face of the second flat plate-like portion 301b. The lower reinforcing portion 501b extends from the bottom end of the first flat plate-like portion 301a, and is welded to the bottom portion of the trailing arm 302 and the bottom face of the second flat plate-like portion 301b.

Provision of such reinforcing portions 501a and 501b allows the trailing arm 302 and the axle carrier 301 to be connected to each other more stiffly, and the stiffness of the trailing arm suspension to be improved.

The upper reinforcing portion 501a and the lower reinforcing portion 501b may be prepared as rigid members, which are separate from the first flat plate-like portion 301a and the second flat plate-like portion 301b. Then, each of the upper reinforcing portion 501a and the lower reinforcing portion 501b may be welded to both the first flat plate-like portion 301a and the second flat plate-like portion 301b.

As shown in FIGS. 8 to 10, in the second modified example, the axle carrier 301 is formed of the first flat plate-like portion 301a, to which the axle bearing is fitted; the second flat plate-like portion 301b, to which the trailing arm 302 is fitted, first reinforcing portions 501'a and 501'b, and a second reinforcing member 801.

The axle carrier 301 is welded to the wheel-side end of the trailing arm 302, as shown in FIG. 8. The bushing collar 502, which houses the bushing provided between the trailing arm 302 and the vehicle body, is formed at the vehicle-body-side end of the trailing arm 302.

The first reinforcing portions 501'a and 501'b are shorter than the reinforcing portions 501a and 501b, respectively, in the first modified example in the longitudinal direction of the reinforcing portions. Although the first reinforcing portions 501'a and 501'b are connected to the second flat plate-like portion 301b, they are not welded to the trailing arm 302.

The second reinforcing member 801 is prepared as a separate member from the first flat plate-like portion 301a, the second flat plate-like portion 301b, and the first reinforcing portions 501'a and 501'b. The second reinforcing member 801 is positioned outboard of the axle carrier 301 and the trailing arm 302. The second reinforcing member 801 is welded to the outboard side of the first flat plate-like portion 301a and the trailing arm 302 such that the reinforcing member 801 extends substantially horizontally.

As shown in FIG. 9, the second reinforcing member 801 is welded so as to substantially entirely cover the outboard side of the first flat plate-like portion 301a. Also, the second reinforcing member 801 and the first flat plate-like portion 301a constitute the drive shaft fitting structure 304. Namely, in the second modified example, the second reinforcing member 801 is arranged between the first flat plate-like portion 301a and the axle bearing (not shown) in the lateral direction of the vehicle.

Provision of such reinforcing portions 501'a and 501'b allows a stiffer connection between the trailing arm 302 and the axle carrier 301, and a improved stiffness of the trailing arm suspension.

The first flat plate-like portion 301a, the second flat plate-like portion 301b and the first reinforcing portions 510'a and 501'b are prepared as a single piece of metal member, and formed, for example, by press working. However, some or all of these portions may be prepared as separate rigid members, and welded to each other.

The invention can be applied to the trailing arm suspension structure and the axle carrier used in the structure, regardless of the appearance, weight, size, running performance, etc. of the vehicle including the trailing arm suspension.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. An axle carrier which is fitted to a wheel-side end of a trailing arm and to which an axle bearing is fitted in a trailing arm suspension for a vehicle, comprising:
  a first flat plate-like member which is arranged substantially parallel to a longitudinal direction of the vehicle, and to which the axle bearing is fitted; and
  a second flat plate-like member which is fixed to a front end of the first flat plate-like member at an angle that falls within a first predetermined angle range, and which is fixed to the wheel-side end of the trailing arm at an angle that falls within a second predetermined angle range,
  wherein the wheel side end of the trailing arm is butt-welded to a front side face of the second flat plate-like member.

2. The axle carrier according to claim 1, wherein
  the first flat plate-like member and the second flat plate-like member are integrally formed with each other.

3. The axle carrier according to claim 1, wherein
  the first predetermined angle range is from 60 degrees to 90 degrees.

4. The axle carrier according to claim 1, wherein
  the second predetermined angle range includes an angle range from 60 degrees to 90 degrees.

5. The axle carrier according to claim 1, further comprising:
  a reinforcing member that is fixed to the first flat plate-like member and the trailing arm.

6. The axle carrier according to claim 5, wherein
  the reinforcing member is integrally formed with the first flat plate-like member.

7. The axle carrier according to claim 5, wherein
  the reinforcing member is fixed to the second flat plate-like member.

8. A trailing arm suspension structure for a vehicle, comprising:
  a pair of right and left trailing arms that are fitted to a vehicle body frame via respective elastic members; and
  axle carriers which are each respectively fitted to wheel-side ends of the pair of right and left trailing arms,
    wherein axle bearings are respectively fitted to the respective axle carriers,
    wherein the respective axle carriers each respectively includes a first flat plate-like member which is arranged substantially parallel to a longitudinal direction of the vehicle, and to which the respective axle bearing is fitted; and a second flat plate-like member to which the wheel-side end of the trailing arm is fitted,
    wherein the second flat plate-like member is fixed to a front end of the first flat plate-like member at an angle that falls within a first predetermined angle range,
    wherein the wheel-side end of the trailing arm is fixed to the second flat plate-like member at an angle that falls within a second predetermined angle range, and
    wherein the wheel-side end of the trailing arm is butt-welded to a front side face of the second flat plate-like member.

9. The trailing arm suspension structure according to claim 8,
  wherein the first flat plate-like member and the second flat plate-like member are integrally formed with each other.

10. The trailing arm suspension structure according to claim 8,
  wherein the first predetermined angle range is from 60 degrees to 90 degrees.

11. The trailing arm suspension structure according to claim 8,
  wherein the second predetermined angle range is from 60 degrees to 90 degrees.

12. The trailing arm suspension structure according to claim 8, further comprising:
  a reinforcing member that is fixed to the first flat plate-like member and the trailing arm.

13. The trailing arm suspension structure according to claim 12, wherein the reinforcing member is integrally formed with the first flat plate-like member.

14. The trailing arm suspension structure according to claim 12, wherein the reinforcing member is fixed to the second flat plate-like member.

* * * * *